(12) United States Patent
Domnits et al.

(10) Patent No.: US 11,982,928 B2
(45) Date of Patent: May 14, 2024

(54) SCANNING LASER PROJECTOR SYSTEM UTILIZING PHOTODIODES INSIDE SCAN AREA BUT OUTSIDE OF PROJECTION AREA FOR FEEDBACK

(71) Applicants: STMicroelectronics LTD, Netanya (IL); STMicroelectronics S.r.l., Agrate Brianza (IT)

(72) Inventors: Alex Domnits, Gedera (IL); Elan Roth, Ramat Hasharon (IL); Davide Terzi, Zanica (IT); Luca Molinari, Piacenza (IT); Marco Boschi, Lissone (IT)

(73) Assignees: STMicroelectronics LTD, Netanya (IL); STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 17/979,363

(22) Filed: Nov. 2, 2022

(65) Prior Publication Data

US 2023/0092956 A1     Mar. 23, 2023

Related U.S. Application Data

(63) Continuation of application No. 17/479,345, filed on Sep. 20, 2021, now Pat. No. 11,774,834.

(51) Int. Cl.
| | |
|---|---|
| G03B 21/14 | (2006.01) |
| G01J 1/02 | (2006.01) |
| G01J 1/44 | (2006.01) |
| G03B 21/00 | (2006.01) |
| G03B 21/20 | (2006.01) |

(52) U.S. Cl.
CPC .......... *G03B 21/142* (2013.01); *G01J 1/0238* (2013.01); *G01J 1/44* (2013.01); *G03B 21/008* (2013.01); *G03B 21/2033* (2013.01)

(58) Field of Classification Search
None
See application file for complete search history.

(56) References Cited

U.S. PATENT DOCUMENTS

| | | | |
|---|---|---|---|
| 9,693,029 B1 | 6/2017 | Jackson | |
| 10,088,742 B2 | 10/2018 | Ogi et al. | |
| 2006/0255243 A1 | 11/2006 | Kobayashi et al. | |
| 2007/0138372 A1* | 6/2007 | Klosowiak | H05B 47/16 250/205 |
| 2009/0033884 A1 | 2/2009 | Yonekubo et al. | |

(Continued)

OTHER PUBLICATIONS

EP Search Report and Written Opinion for counterpart EP Appl. No. 22195417.5, report dated Feb. 10, 2023, 12 pgs.

*Primary Examiner* — Bao-Luan Q Le
*Assistant Examiner* — Danell L Owens
(74) *Attorney, Agent, or Firm* — Crowe & Dunlevy LLC (57) ABSTRACT

A scanning laser projector includes an optical module with a housing defined by a top surface, a bottom surface, and sidewalls extending between the top surface and bottom surface to define an interior compartment within the housing. A given one of the sidewalls has an exit window defined therein. A first light detector is positioned at an interior surface of the given one of the sidewalls about a periphery of the exit window. A second light detector positioned at the interior surface of the given one of the sidewalls about the periphery of the exit window and on a different side thereof than the first light detector.

17 Claims, 7 Drawing Sheets

(56) References Cited

U.S. PATENT DOCUMENTS

| | | | |
|---|---|---|---|
| 2009/0141252 A1* | 6/2009 | Kamijima | G03B 21/2053 |
| | | | 353/85 |
| 2010/0302515 A1* | 12/2010 | Plut | H04N 9/3161 |
| | | | 353/85 |
| 2012/0154882 A1 | 6/2012 | Chou et al. | |
| 2013/0003026 A1 | 1/2013 | Rothaar | |
| 2013/0181109 A1 | 7/2013 | Chou et al. | |
| 2018/0020198 A1 | 1/2018 | Ogi et al. | |
| 2022/0137400 A1 | 5/2022 | Domnits et al. | |

* cited by examiner

SCANNING LASER PROJECTOR SYSTEM UTILIZING PHOTODIODES INSIDE SCAN AREA BUT OUTSIDE OF PROJECTION AREA FOR FEEDBACK

RELATED APPLICATION

This application is a continuation of United State Application for patent Ser. No. 17/479,345, filed Sep. 20, 2021, the contents of which are incorporated by reference in their entirety.

TECHNICAL FIELD

This disclosure is directed to the field of laser scanning projectors and, in particular, to a scanning laser projector system utilizing one or more photodiodes in the projector's scan area within the housing of the laser scanning projector, but outside of the projector's projection area, to provide feedback on laser beam angular position and laser beam optical power.

BACKGROUND

A laser scanning projector is a small, portable electronic device. Laser scanning projectors are typically paired to, or incorporated within, user devices such as smart glasses, smartphones, tablets, laptops, or digital cameras, and used to project virtual and augmented reality, documents, images, or video stored on those user devices onto a projection surface, such as a wall, light field, holographic surface, or inner display surface of virtual or augmented reality glasses. Laser scanning projectors are also incorporated within distance determination systems within vehicles to determine information about the vehicle relative its surroundings, permitting the creation of advanced driver assistance systems.

Such laser scanning projectors typically include a projection subsystem and an optical module. The paired user device serves an image stream (e.g., a video stream, or a pattern projected into an area used for distance determination) to the projection subsystem. The projection subsystem properly drives the optical module to project the image stream onto the projection surface or environment for viewing.

In greater detail, typical optical modules are comprised of one or more laser sources and one or more microelectromechanical (MEMS) mirrors that scan the laser beam produced by the laser source across the projection surface in a projection pattern. By modulating the laser beam (in the case of an image projection system) according to its position on the projection surface, while the laser beam is scanned in the projection pattern, the image stream is displayed. Commonly, at least one lens focuses the beam before being reflected by the one or more MEMS mirrors, and then the laser beam strikes the projection surface or environment, although optical modules of other designs may be used.

The projection subsystem controls the driving of the laser source and the driving of the movement of the one or more MEMS mirrors. Typically, the driving of movement of one of MEMS mirrors is at, or close to, the resonance frequency of that MEMS mirror, and the driving of movement of another of the MEMS mirrors is performed linearly and not at resonance, although there are projection subsystem architectures in which both mirrors are driven close to their resonance frequency.

Monitoring of the mirror movement of the one or more MEMS mirrors is performed by the projection subsystem, for example to determine the opening angle of the one or more MEMS mirrors. This is used as feedback to maintain the opening angle at a desired value, and also to determine whether a mirror malfunction has occurred. When a mirror malfunction has occurred, it is desired to immediately turn off the laser sources. Existing systems that perform monitoring of mirror movement may require extensive calibration, which is not desirable because of increased production time and cost. In addition, it is possible for failure of mirror drive electronics to yield a false negative using existing systems, leading to continued operation of a malfunctioning system. Thus, it would be desired for there to be a backup for mirror opening angle determination that does not fail when the mirror drive electronics fail.

Typically, a power detector is placed within a path traveled by the laser beam within the optical module prior to the laser beam reaching the MEMS mirrors, with this power detector operating to detect the laser beam and generate a signal based upon the laser beam. From this signal, information about the laser beam itself can be determined. For example, information about the spot size of the laser beam, luminosity of the laser beam, color calibration of the laser beam, frequency of the laser beam, and modulation speed of the laser beam can be determined. However, if such power detector or the circuitry reading the power detector and performing the calculations to produce the desired data experiences a failure, this functionality would be lost, and the laser scanning projector would fail. This, it is desired for there to be a backup power detection system. To accomplish this, it is conventional for the circuitry reading the power detector and performing the calculations to produce the desired data to be replicated, therefore providing an alternative backup path, and permitting proper operation of the laser scanning projector. However, this increases cost, complexity, and area consumed by the electronics for the laser scanning projector.

As such, it would be advantageous if a system could be designed which can provide an optical opening angle monitoring as well as a backup power detection system, while overcoming the drawbacks outlined above. As such, further development is needed.

SUMMARY

Disclosed herein is a scanning laser projector including an optical module. The optical module includes a housing carrying: a laser generator configured to output a single laser beam; a movable mirror apparatus; wherein the movable mirror apparatus is configured to scan the single laser beam across an exit window defined through the housing in a scanning pattern wider than the exit window such that the single laser beam is directed through the exit window in a projection pattern, the projection pattern being smaller than and within the scanning pattern; and a first light detector positioned about a periphery of the exit window such that as the movable mirror apparatus scans the single laser beam in the scan pattern, at a point in the scan pattern where the single laser beam is scanned across an interior of the housing and not through the exit window, the single laser beam impinges upon the first light detector. A projection engine is configured to adjust driving of the movable mirror apparatus based upon output from the first light detector.

The movable mirror apparatus may include a first mirror position sensor generating output indicative of deflection of a first mirror within the movable mirror apparatus. The projection engine may include: a trigger circuit coupled to receive output from the first light detector and to assert a trigger signal in response to the output from the first light detector indicating that the single laser beam has impinged upon the first light detector; a first sample/hold circuit configured to sample and hold output of the first mirror position sensor in response to assertion of the trigger signal as a first held value; an analog to digital converter configured to digitize the first held value to produce a first digitized value; and a control circuit configured to adjust driving of the movable mirror apparatus based upon the first digitized value.

The control circuit may be configured to calibrate the first mirror position sensor based upon the first digitized value.

The control circuit may calibrate the first mirror position sensor based upon the first digitized value using a priori knowledge of an expected deflection angle of the first mirror when the single laser beam impinges upon the first light detector.

The control circuit may calibrate the first mirror position sensor based upon the first digitized value by: determining an instantaneous gain in output of the first mirror position sensor as a ratio of a calibration value to the first digitized value; and scaling the first digitized value to account for the instantaneous gain in the output of the first mirror position sensor prior to adjusting driving of the movable mirror apparatus based upon the first digitized value.

The projection engine may adjust the driving of the movable mirror apparatus to maintain a first mirror within the movable mirror apparatus at a first opening angle, based upon the first digitized value.

The projection engine may be configured to cause the laser generator to cease outputting the single laser beam based upon lack of the trigger circuit asserting the trigger signal.

The projection engine may be configured to cause the laser generator to cease outputting the single laser beam based upon lack of the trigger circuit asserting the trigger signal when expected.

A second light detector may be positioned about the periphery of the exit window and on a different side thereof than the first light detector, the second light detector being located such that as the movable mirror apparatus scans the single laser beam in the scan pattern, at a point in the scan pattern where the single laser beam is scanned across an interior of the housing and not through the exit window, the single laser beam impinges upon the second light detector. The projection engine may adjust the driving of the movable mirror apparatus based upon output from the first and second light detectors.

The movable mirror apparatus may include a second mirror position sensor generating output indicative of deflection of a second mirror within the movable mirror apparatus. The trigger circuit may also be coupled to receive output from the second light detector and to assert the trigger signal in response to the output from the second light detector indicating that the single laser beam has impinged upon the second light detector. The projection engine may further include a second sample/hold circuit configured to sample and hold output of the second mirror position sensor in response to assertion of the trigger signal as a second held value. The analog to digital converter may be further configured to digitize the second held value to produce a second digitized value, and wherein the control circuit may be further configured to adjust driving of the movable mirror apparatus based upon the second digitized value.

The control circuit may be configured to calibrate the first mirror position sensor based upon the first digitized value and calibrate the second mirror position sensor based upon the second digitized value.

The control circuit may calibrate the first mirror position sensor based upon the first digitized value using a priori knowledge of an expected deflection angle of the first mirror when the single laser beam impinges upon the first light detector and calibrates the second mirror position sensor based upon the second digitized value using a priori knowledge of an expected deflection angle of the second mirror when the single laser beam impinges upon the second light detector.

The control circuit may calibrate the first mirror position sensor based upon the first digitized value by: determining an instantaneous gain in output of the first mirror position sensor as a ratio of a first calibration value to the first digitized value; and scaling the first digitized value to account for the instantaneous gain in the output of the first mirror position sensor prior to adjusting driving of the movable mirror apparatus based upon the first digitized value. The control circuit may calibrate the second mirror position sensor based upon the second digitized value by: determining an instantaneous gain in output of the second mirror position sensor as a ratio of a second calibration value to the second digitized value; and scaling the second digitized value to account for the instantaneous gain in the output of the second mirror position sensor prior to adjusting driving of the movable mirror apparatus based upon the second digitized value.

The control circuit may be configured to generate a synchronization signal for the first mirror or the second mirror based upon an elapsed time between detections of the single laser beam by the first light detector and then by the second light detector.

The projection engine may adjust the driving of the movable mirror apparatus so as to maintain a first mirror within the movable mirror apparatus at a first opening angle, based upon the output from the first light detector.

The projection engine may be configured to cause the laser generator to cease outputting the single laser beam based upon the output from the first light detector indicating that the single laser beam did not impinge upon the first light detector.

The projection engine may be configured to cause the laser generator to cease outputting the single laser beam based upon the output from the first light detector indicating that the single laser beam did not impinge upon the first light detector when expected.

The projection engine may be configured to cause the laser generator to modify color and intensity of the single laser beam based upon the output from the first light detector.

Also disclosed herein is an optical module including a housing, the housing carrying: a laser generator configured to output a single laser beam; a movable mirror apparatus; wherein the movable mirror apparatus is configured to scan the single laser beam across an exit window defined through the housing in a scanning pattern wider than the exit window such that the single laser beam is directed through the exit window in a projection pattern, the projection pattern being smaller than and within the scanning pattern; a first light detector positioned about a periphery of the exit window such that as the movable mirror apparatus scans the single laser beam in the scan pattern, at a point in the scan pattern where the single laser beam is scanned across an interior of the housing and not through the exit window, the single laser beam impinges upon the first light detector; and a second light detector positioned about the periphery of the exit window and on a different side thereof than the first light detector, the second light detector being located such that as the movable mirror apparatus scans the single laser beam in the scan pattern, at a point in the scan pattern where the single laser beam is scanned across an interior of the housing and not through the exit window, the single laser beam impinges upon the second light detector.

The first and second light detectors may be located on opposite sides of the periphery of the exit window, outside of the projection pattern but inside the scanning pattern.

The first and second light detectors may be located on opposite sides of a first axis that bisects the exit window.

The first and second light detectors may also be located on opposite sides of a second axis perpendicular to the first axis.

Also disclosed herein is a method of operating a laser scanning projector contained within a housing, the method including: generating a single laser beam; scanning the single laser beam across an exit window defined through the housing in a scanning pattern wider than the exit window such that the single laser beam is directed through the exit window in a projection pattern, the projection pattern being smaller than and within the scanning pattern; at points in the scan pattern where the single laser beam is scanned across an interior of the housing and not through the exit window, detecting the single laser beam as it impinges upon a first light detector positioned about a periphery of the exit window; and adjusting the scanning of the laser beam based upon the impinging of the single laser beam upon the first light detector.

The scanning of the single laser beam may be accomplished via deflection of a movable mirror apparatus. Adjusting the scanning of the laser beam based upon the impinging of the single laser beam upon the first light detector may include: in response to the impinging of the single laser beam upon the first light detector, digitizing a mirror position signal supplied by a mirror position sensor associated with the movable mirror apparatus, and adjusting movement of the movable mirror apparatus based upon the digitized mirror position signal.

The method may include calibrating the mirror position sensor based upon the digitized mirror position signal.

The method may include correcting the digitized mirror position signal based upon the calibration of the mirror position sensor.

The method may further include determining an instantaneous gain in output of the mirror position sensor as a ratio of a calibration value to the digitized mirror position signal, and scaling the digitized mirror position signal to account for the instantaneous gain in the output of the mirror position sensor prior to adjusting movement of the movable mirror apparatus based upon the digitized mirror position signal.

The method may further include ceasing generation of the single laser beam based upon lack of impinging of the single laser beam upon the first light detector.

The method may further include ceasing generation of the single laser beam based upon lack of impinging of the single laser beam upon the first light detector at an expected time.

The method may further include adjusting the generation of the single laser beam based upon output from the first light detector.

Disclosed herein is a scanning laser projector including an optical module. The optical module includes a housing defined by a top surface, a bottom surface, and sidewalls extending between the top surface and bottom surface to define an interior compartment within the housing. A given one of the sidewalls has an exit window defined therein. A first light detector is positioned at an interior surface of the given one of the sidewalls about a periphery of the exit window. A second light detector is positioned at the interior surface of the given one of the sidewalls about the periphery of the exit window and on a different side thereof than the first light detector.

The first and second light detectors may be located on opposite sides of the periphery of the exit window.

The first and second light detectors may be located on opposite sides of a vertical axis that bisects the exit window. The first and second light detectors may also located on opposite sides of a horizontal axis perpendicular to vertical first axis.

A movable mirror apparatus may be within the optical module. A projection engine may be configured to adjust driving of the movable mirror apparatus based upon output from the first and second light detectors.

The projection engine may adjust the driving of the movable mirror apparatus to maintain a first mirror within the movable mirror apparatus at a first opening angle.

The projection engine may be configured to generate horizontal and vertical synchronization signals for movable mirror apparatus based upon an elapsed time between detections of the single laser beam by the first light detector and then by the second light detector.

The projection engine may be further configured to determine failure of the movable mirror apparatus based upon a lack of expected output from the first and second light detectors at expected times.

A third light detector may be positioned at the interior surface of the given one of the sidewalls about the periphery of the exit window and on a different side thereof than the first and second light detectors. A fourth light detector may be positioned at the interior surface of the given one of the sidewalls about the periphery of the exit window and on a different side thereof than the first, second, and third light detectors. The first and second light detectors may be located on opposite sides of a vertical axis that bisects the exit window. The third and fourth light detectors may be located on opposite sides of a horizontal axis that bisects the exit window.

The third and fourth light detectors may be located along the vertical axis. A fifth light detector may be positioned at the interior surface of the given one of the sidewalls about the periphery of the exit window and on a same side of the exit window as the third light detector. A sixth light detector may be positioned at the interior surface of the given one of the sidewalls about the periphery of the exit window and on a same side of the exit window as the third light detector but on an opposite side of the vertical axis as the fifth light detector.

A seventh light detector may be positioned at the interior surface of the given one of the sidewalls about the periphery of the exit window and on a same side of the exit window as the fourth light detector. An eighth light detector may be positioned at the interior surface of the given one of the sidewalls about the periphery of the exit window and on a same side of the exit window as the fourth light detector but on an opposite side of the vertical axis as the seventh light detector.

The fifth and eighth light detectors may be located along a first diagonal axis that forms an obtuse angle with the horizontal axis. The sixth and eleventh light detectors may be located along a second diagonal axis that forms an acute angle with the horizontal axis.

The first light detector may be an array of photodiodes.

Also disclosed herein is a method of operating a laser scanning projector contained within a housing. The method includes generating a single laser beam, scanning the single laser beam across an exit window defined through the housing in a scanning pattern wider than the exit window such that the single laser beam is directed through the exit window in a projection pattern, the projection pattern being smaller than and within the scanning pattern, and taking action based upon attempted detection of the single laser beam as it impinges upon a first light detector positioned about a periphery of the exit window.

The action taken based upon the attempted detection of the single laser beam as it impinges upon the first light detector positioned about the periphery of the exit window may be to cease generation of the single laser beam when detection of the single laser beam does not occur at an expected time.

The scanning of the single laser beam may be performed using a movable mirror. The expected time may be every half swing of the movable mirror.

The scanning of the single laser beam may be performed using a movable mirror. The action taken based upon the attempted detection of the single laser beam as it impinges upon the first light detector positioned about the periphery of the exit window may be to measure optical attenuation of the single laser beam due to the movable mirror.

The scanning of the single laser beam may be performed using a movable mirror. The method may also include comprising measuring color and intensity of the single laser beam prior to scanning by the movable mirror. The method may further include measuring color and intensity of the single laser beam after scanning by the movable mirror using the first light detector. The action taken based upon the attempted detection of the single laser beam as it impinges upon the first light detector positioned about the periphery of the exit window may be to compare the color and intensity data measured prior to scanning to color and intensity data measured by the first light detector.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
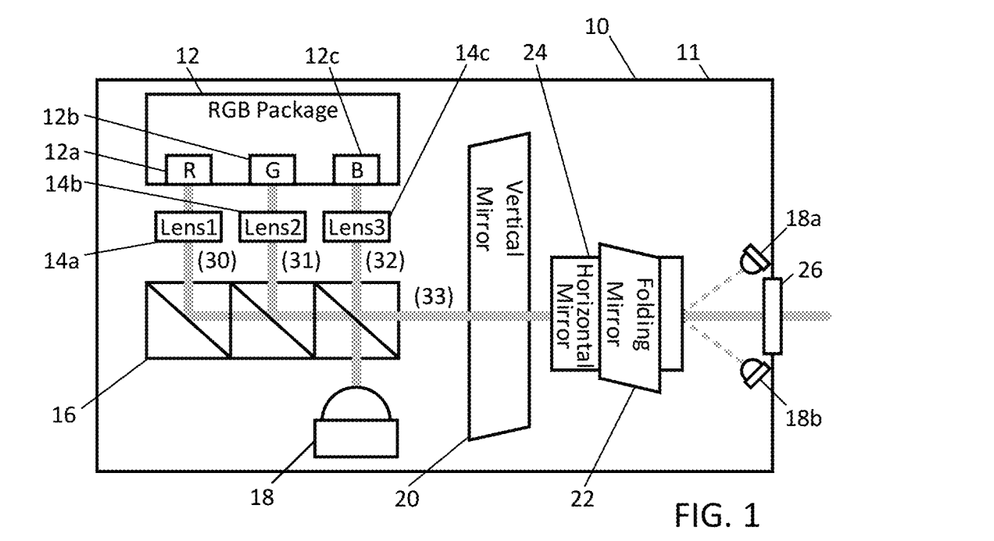
FIG. 1 is a diagrammatical representation of an optical module disclosed herein.

An optical module 10 is now described with reference to FIG. 1. The optical module 10 includes a housing 11 carrying a compact RGB laser package 12 that includes a red laser diode 12a, green laser diode 12b, and blue laser diode 12c therein.

Alignment lenses 14a, 14b, and 14c are carried within the housing 11 adjacent the RGB laser package 12, and serve to collimate the laser beams 30, 31, and 32 respectively generated by the red laser diode 12a, green laser diode 12b, and blue laser diode 12c in operation. The alignment lenses 14a, 14b, and 14c are set such that the laser spots would overlap at a certain distance, for example, at a 450 mm focal distance. In addition, the maximum angular deviation between any two laser spots may helpfully be no more than 0.2°, and the maximum deviation between all laser spots should helpfully be no more than 0.5°. The spot size produced by the red laser diode 12a, after focusing by the alignment lens 14a, may be around 830×650 microns; the spot size produced by the blue laser diode 12b, after focusing by the alignment lens 14b, may be around 800×600 microns; and the spot size produced by the green laser diode 12c, after focusing by the alignment lens 14c, may be around 780×550 microns. If the focal distance is changed from this example for a particular application, the spot size changes accordingly. The alignment lenses 14a, 14b, and 14c may have a numerical aperture of 0.38, with an effective focal length of 2 mm, and a 1 mm diameter, and may be coated with anti-reflective coating that allows light in the range of 400 nm-700 nm to pass but rejects other light. The alignment lenses 14a, 14b, and 14c may have a generally cylindrical cross section, with a flat rear surface and a convex front surface, or, in some cases, may have an aspherical shape. The effective focal length and diameter of the alignment lenses 14a, 14b, and 14c can be altered as desired for specific applications. For example, the alignment lenses 14a, 14b, and 14c may be 1.5 mm in diameter. It will also be appreciated that in some cases, the alignment lenses 14a, 14b, and 14c may have different diameters from one another, or one of the alignment lenses may have a different diameter than the other two alignment lenses.

A 4:1 beam splitter 16 is carried within the housing 11 adjacent the alignment lenses 14a, 14b, and 14c. This beam splitter 16 is a single rectangularly shaped unit formed of three square units, each square unit being comprised of two triangular prisms having their bases affixed to one another. The overall dimensions of the beam splitter may be, for example, 6 mm in length, 2 mm in depth, and 2.5 mm in height. Naturally, these dimensions are just examples, and the beam splitter 16 may instead have other dimensions, and individual lenses may be used instead of the beam splitter.

The prisms of the beam splitter 16 that serve to reflect the laser beams 30 and 31 are arranged so as to reflect as close to 100% of those beams as possible along a trajectory out the right side of the beam splitter 36 to help form the combined RGB laser beam 33, while the prisms of the beam splitter 16 that serve to reflect the laser beam 32 are arranged so as to reflect about 98% of the laser beam 32 out the right side of the beam splitter 36 to form the combined RGB laser beam 33, while passing about 2% of the laser beam 32 through to reach a photodiode 18 used to provide feedback for the system driving the laser diodes 12a, 12b, and 12c of the RGB laser package 12.

While the beam splitter 16 here is used to combine the laser beams 30, 31, and 32 to form the RGB laser beam 33, the beam splitter 16 is still technically a 4:1 beam splitter, as if a beam 33 were to be input into the right side (the output) of the beam splitter 16, the beam splitter would split it to produce the beams 32 (exiting toward the lens 14c and toward the photodiode 18), 31, and 30. Thus, despite its use as a beam combiner, the component 16 is indeed a beam splitter 16.

Figure 2:
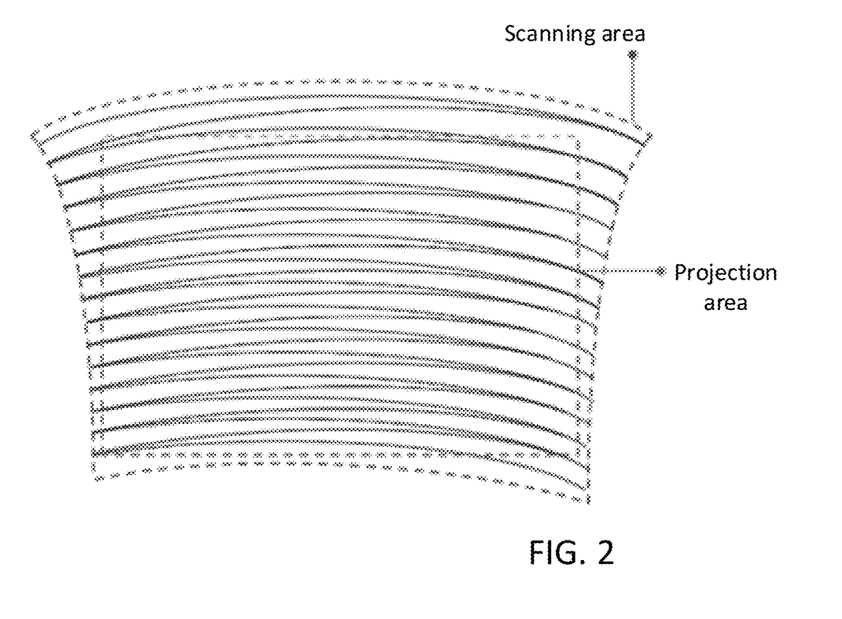
FIG. 2 is a diagrammatical representation of the scanning area and projection area defined by the movement of the mirrors of the optical module of FIG. 1.

A vertical mirror 20, a horizontal mirror 24, and a folding mirror 22 are adjacent the beam splitter 16, and collectively are used to reflect the RGB laser beam 33 out an exit window 26 on a housing 11 and onto a display surface. Note that the position of the folding mirror 22 is fixed during operation, while the horizontal mirror 24 is driven to oscillate at its resonance frequency and the vertical mirror 20 is driven linearly. Therefore, the purpose of the folding mirror 22 is simply to "fold" the path of the RGB laser beam 33 to strike the horizontal mirror 24, while the purpose of the horizontal mirror 24 and vertical mirror 20 is to scan the RGB laser beam 33 across the display surface in a scan pattern designed to reproduce the desired still or moving images. The total area scanned by the horizontal mirror 24 and vertical mirror 20 defines a scanning area, as shown in FIG. 2; similarly, the pattern formed by the laser beam during the portion of the scanning area during which the laser beam 33 exits the exit window 26 defines a projection area, as shown in FIG. 2. Thus, understand that the laser beam 33 may be scanned across portions of the inside surface of the housing wall 11 (on the side thereof where the exit window 26 is located). As a result, the scanning area is larger the projection area, and the projection area is included within the scanning area, as seen in FIG. 2.

The overall dimensions of the vertical mirror 20 may be, for example, 7.94 mm in length, 2.34 mm in depth, and 0.67 mm in height; the overall dimensions of the horizontal mirror 24 may be, for example, 4.44 mm in length, 2.94 mm in depth, and 0.67 mm in height. Naturally, the vertical mirror 20 and horizontal mirror 24 may have other dimensions, and the given dimensions are just examples.

Figure 3:
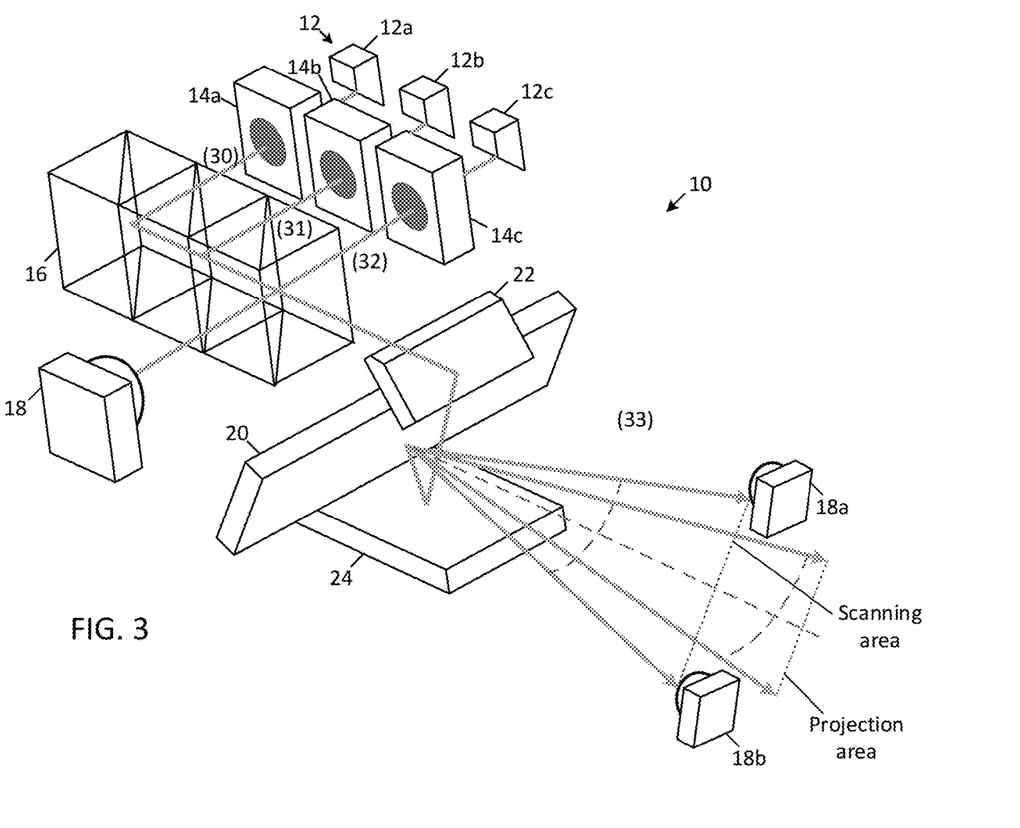
FIG. 3 is a perspective view of components of the optical module of FIG. 1.

Turning now to FIG. 3, the geometry of the vertical mirror 20, horizontal mirror 24, and folding mirror 22 is now described in the context of the optical module 10. The RGB laser beam 33 is aimed by the beam splitter 16 to pass over the top of the vertical mirror 20 to strike the folding mirror 22, which reflects the RGB laser beam 33 onto the horizontal mirror 24, which then reflects the RGB laser beam 33 onto the vertical mirror 20, which reflects the RGB laser beam 33 out the exit window 26 on the housing 11 and onto the display surface. The beam splitter 16 splits the RGB laser beam 33 such that a portion of the RGB laser beam 33 is reflected to strike the photodiode 18 within the optical module 10, and the output of the photodiode 18 is used as feedback for control of the RGB laser beam 33 and the laser beams 30, 31, and 32 that are combined to form the RGB laser beam 33.

Figure 4:
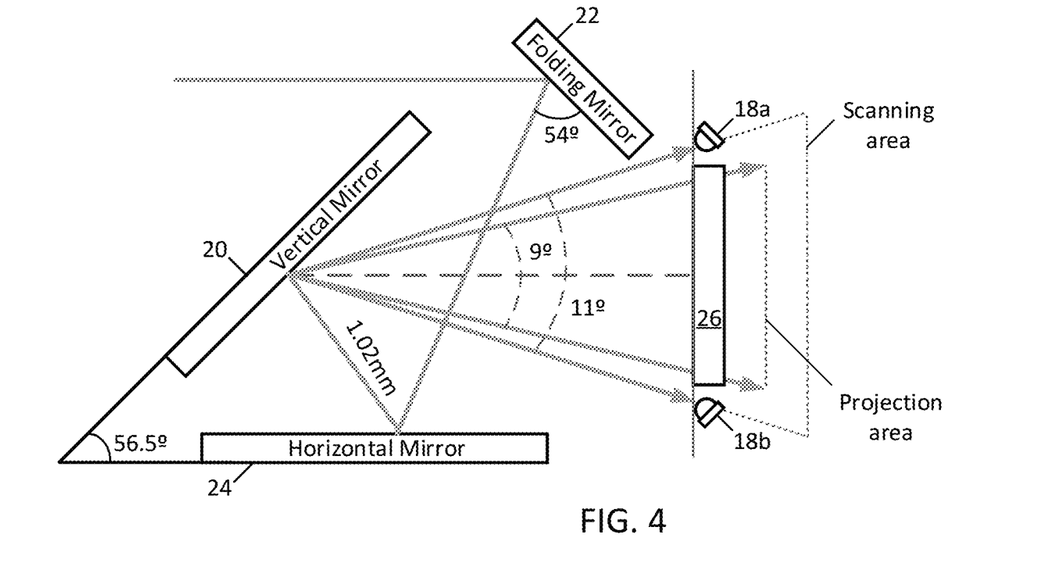
FIG. 4 is diagrammatical representation of the vertical mirror, horizontal mirror, and folding mirror of FIG. 1.

Sample angles for this path taken by the RGB laser beam 33 may be seen in FIG. 4, where the folding mirror 32 reflects the RGB laser beam 33 at an angle of 54° toward the horizontal mirror 24, and the horizontal mirror 24 reflects the RGB laser beam 33 at an angle of 54° toward the vertical mirror. The vertical mirror 20 is arranged to reflect the RGB laser beam 33 in a direction parallel to the plane in which the horizontal mirror 24 lies, and therefore directly out the exit window 26 without any keystone. In this arrangement, it may be observed that the path traveled by the RGB laser beam 33 between the centers of the horizontal mirror 24 and vertical mirror 20 is about 1.02 mm. Notice here that the opening angle of the vertical mirror 20 is 11°, defining the scanning area in the vertical direction. However, also see that the projection area in the vertical direction is less than this, and that, for example, the projection area in the vertical direction is defined by 9° degrees of the opening angle of the vertical mirror 20.

Figure 5:
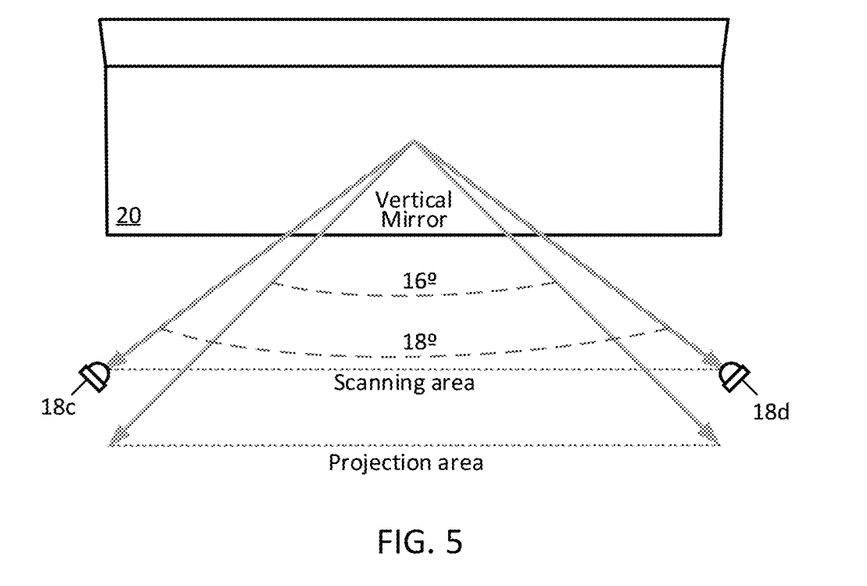
FIG. 5 is a diagrammatical front elevational view of the vertical mirror of FIG. 1, and the scanning area and projection area defined by the movement of the horizontal mirror of FIG. 1.

Referring now to FIG. 5, it can be observed that the opening angle of the horizontal mirror 24 is 18°, defining the scanning area in the horizontal direction. Also observe that the projection area in the horizontal direction is less than this, and that, for example, the projection area in the horizontal direction is defined by 16° of the opening angle of the vertical mirror, with the aspect ratio of the resulting projection area being 16:9, for example.

First, the position of additional photodiodes 18a and 18b within the housing 11 will be described in detail, as will be the position of additional other photodiodes, and then the usage for those photodiodes 18a and 18b will be described in detail. However, in general, understand that the photodiodes 18a, 18b, and other photodiodes within the housing, may be used as a backup for the photodiode 18, and may be used to collect data to be used for monitoring and modifying operation of the laser scanning projector 10.

As shown in FIGS. 1, 3, 4, and 5, in addition to the photodiode 18 being used to provide feedback about the laser beam 33, photodiodes 18a and 18b are positioned within the housing 11 on opposite sides of the exit window 26. As is well shown in FIGS. 3-4, the photodiodes 18a and 18b are positioned outside of the projection area but within the scanning area; the photodiodes 18a and 18b are also positioned downstream of the mirrors 20 and 24, meaning that it is the light that is reflected by the mirrors 20 and 24 that reaches the photodiodes 18a and 18b. The photodiodes 18a and 18b do not occlude any portion of the projection area, but when the laser beam 33 is scanned across the scanning area outside of the projection area, the photodiodes 18a and 18b detect the laser beam 33 when it impinges upon them. In the examples shown in FIGS. 1 and 3-4, the photodiodes 18a and 18b are located on opposite vertical sides of the exit window 26, meaning that when the laser beam 33 impinges upon the photodiode 18a it has moved outside of the projection area in the positive vertical direction, and when the laser beam 33 impinges upon the photodiode 18b it has moved outside of the projection area in the negative vertical direction.

As shown in FIG. 5, photodiodes 18c and 18b are positioned within the housing on opposite sides of the exit window. As is well shown in FIG. 4, the photodiodes 18c and 18b are positioned outside of the projection area but within the scanning area, and therefore do not occlude the projection area. However, when the laser beam 33 is scanned across the scanning area outside of the projection area, the photodiodes 18c and 18d detect the laser beam 33 when it impinges upon them. In the example shown in FIG. 5, the photodiodes 18c and 18d are located on opposite horizontal sides of the exit window 26, meaning that when the laser beam 33 impinges upon the photodiode 18c it has moved outside of the projection area in the negative horizontal direction, and when the laser beam 33 impinges upon the photodiode 18d it has moved outside the projection area in the positive horizontal direction.

Figure 6:
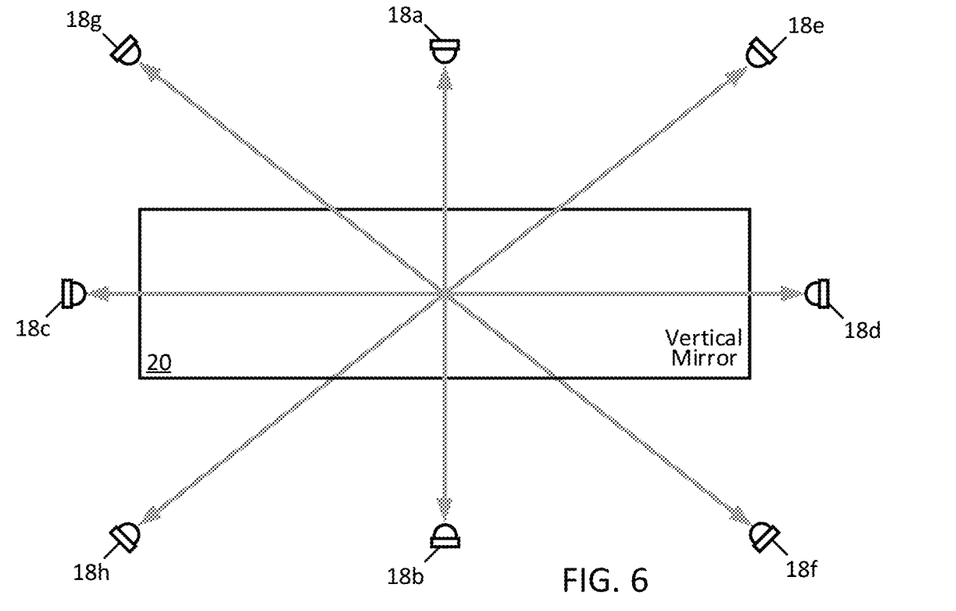
FIG. 6 is a diagrammatical front view of the vertical mirror of FIG. 1, showing possible placements for the photodiodes located within the scanning area but outside of the projection area.

Although between FIGS. 1 and 3-5 the use of four photodiodes 18a-18d is shown, understand that more such photodiodes may be used. For example, shown in FIG. 6 is an example where there are eight such photodiodes 18a-18g are shown. Less than eight photodiodes, and as few as two photodiodes may be used, with possible positions for each diode used being one of the positions shown in FIG. 6.

Figure 7:
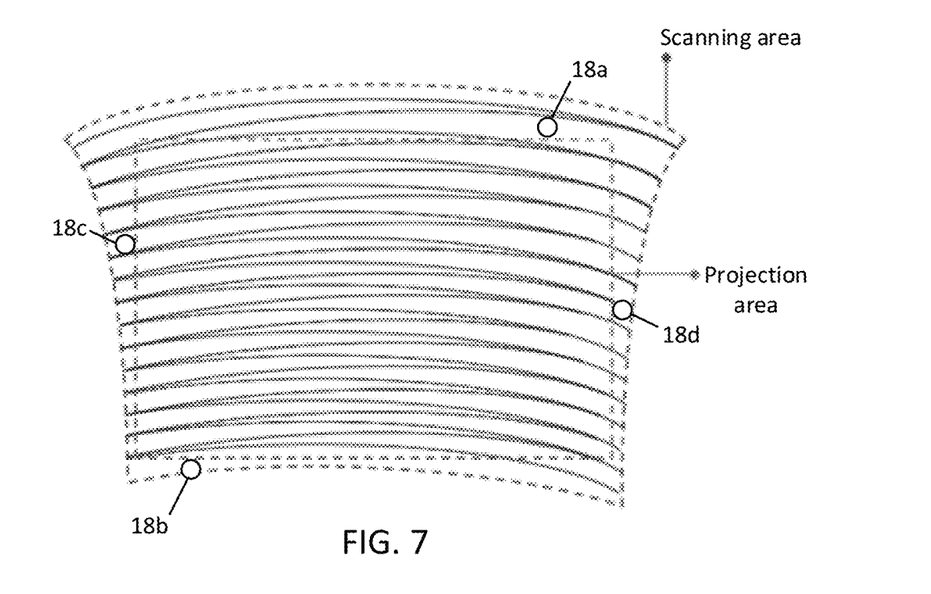
FIG. 7 is a diagrammatical representation of the scanning area and projection area defined by the movement of the mirrors of the optical module of FIG. 1, including potential positions for the photodiodes located within the scanning area but outside of the projection area.

In the above examples, the photodiodes 18a-18d were shown as being placed along the horizontal and vertical axis of the projection area, but it should be understood that this need not be the case. For example, see the case shown in FIG. 7, where photodiode 18a is located to the right of the vertical axis of the projection area, photodiode 18b is located to the left of the vertical axis of the projection area, photodiode 18c is located above the horizontal axis of the projection area, and photodiode 18d is located below the horizontal axis of the projection area.

Figure 8A:
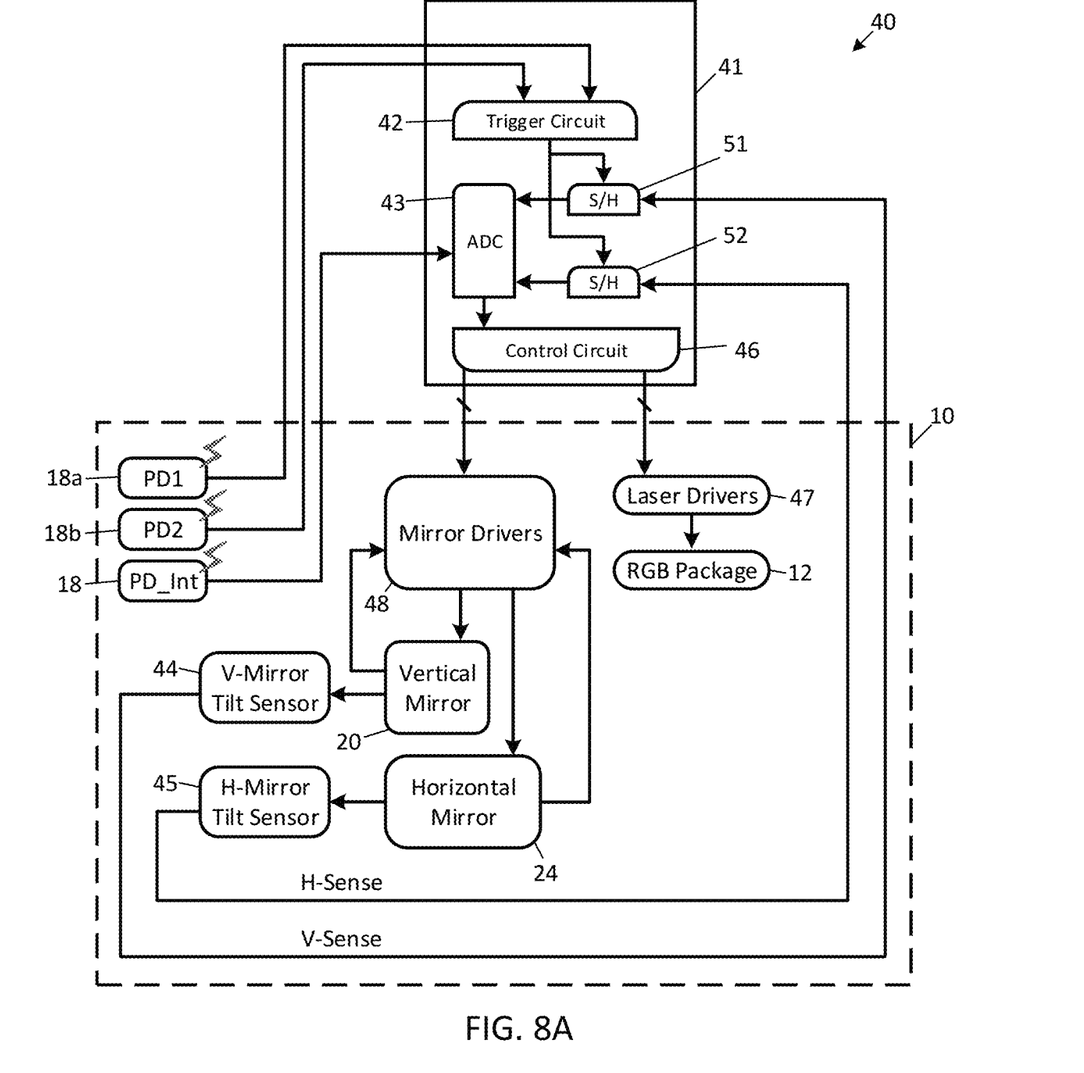
FIG. 8A is a first embodiment of a block diagram of a scanning laser projector including the optical module of FIG. 1.

Details of a laser scanning projector 40 incorporating the optical module 10 and a projection engine 41, utilizing the photodiodes 18a and 18b within the optical module 10 for feedback, are now given with reference to FIG. 8A. The optical module 10 includes the components described above, with here the RGB laser package 12, vertical mirror 20, and horizontal mirror 24 being shown, but the lenses 14a-14c, beam splitter 16, folding mirror 22, and exit window 26 not being shown for simplicity.

Referring now to the optical module 10, the vertical mirror 20 has a tilt sensor 44 associated therewith to measure deflection or tilt of the vertical mirror 20. The tilt sensor 44 may be piezoelectric or piezoresistive, and provides a signal V-Sense indicative of the deflection or tilt of the vertical mirror 20 to the projection engine 41. The horizontal mirror 24 has a similar tilt sensor 45 associated therewith to measure deflection or tilt of the horizontal mirror 24, and provides a signal H-Sense indicative of the deflection or tilt of the horizontal mirror 20 to the projection engine 41. The vertical mirror 20 and horizontal mirror 24 are driven by mirror drivers 48, with the vertical mirror 24 being driven at resonance and the horizontal mirror 20 being driven linearly. Laser drivers 47 drive the RGB laser package 12 to cause the lasers within the RGB laser package 12 to lase at desired times and desired intensities.

The projection engine 41 is now described. The projection engine 41 includes a sample/hold circuit 51 that receives the signal generated by the tilt sensor 44 of the vertical mirror 20, and a sample/hold circuit 52 that receives the signal generated by the tilt sensor 45 of the horizontal mirror 44. An analog-to-digital converter (ADC) 43 receives the values held by the sample/hold circuits 51 and 52, digitizes those values, and provides them to a control circuit 46. The photodiode 18 is also fed to the ADC 13, which provides a digitized version of the photodiode 18 output to the control circuit 46, which generates control signals for the mirror drivers 48 and the laser drivers 47 based partly on the photodiode 18, and on the photodiodes 18a and 18b. A trigger circuit 42 receives output from the photodiodes 18a and 18b (as well as any other photodiodes such as photodiodes 18c-18g present within the housing 11), and triggers the sample/hold circuits 51 and 52 to sample and hold the signal at their inputs when the photodiodes detect impinging laser light.

Operation is now described. As explained earlier, the mirror drivers 48 drive the vertical mirror 24 at resonance and drive the horizontal mirror 20 linearly while the RGB package 12 generates and modulates the laser beam 33 accordingly to form a desired image or to scan a scene for performing depth sensing. As explained above, the laser beam 33 is scanned (reflected) by the mirrors in a pattern. In particular, the driving of the mirrors 20 and 24 serves to scan the laser beam 33 in a scan pattern in a scanning area, shown for example in FIG. 2. The photodiode 18, as explained above is within the beam generation path inside the optical module 10 as shown in FIGS. 1 and 3, and provides feedback to the control circuit 46, which in turn modifies its control of the mirror drivers 48 and laser drivers 47 based upon that feedback. In particular, the intensity, color, and modulation of the laser can be modified by the control circuit 46 based upon the feedback provided by the photodiode 18.

As explained above, the scanning area is larger than the projection area, meaning that as the mirrors 20 and 24 scan the laser beam 33 across the portion of the scanning area outside of the projection area, they are scanning the laser beam 33 across the inside wall of the housing 11 of the optical module 10 adjacent the location of the window 26.

Figure 9:
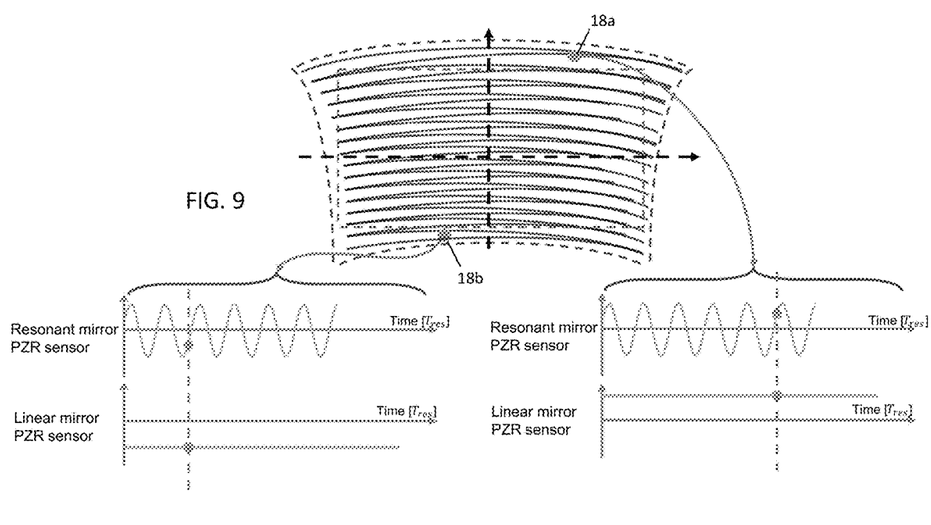
FIG. 9 is a diagrammatical representation of the scanning area and projection area defined by the movement of the mirrors of the optical module of FIG. 1, including potential positions for the photodiodes located within the scanning area but outside of the projection area, and showing the mirror drive signals.

When the laser beam 33 scans across the photodiode 18a, for example, the output signal generated by the photodiode 18a is received by the trigger circuit 42, which in turn activates the sample/hold circuit 51. When activated, the sample/hold circuit 51 samples and holds the current value of V-sense, which is the output of the tilt sensor 44 for the vertical mirror 20. Similarly, when the laser beam 33 scans across the photodiode 18b, the output signal generated by the photodiode 18b is received by the trigger circuit 42, which in turn activates the sample/hold circuit 52. When activated, the sample/hold circuit 52 samples and holds the current value of H-sense, which is the output of the tilt sensor 45 for the horizontal mirror 24. See, for example, FIG. 9, showing the data points of V-Sense and H-Sense captured when the photodiodes 18a and 18b are impinged upon by the laser beam 33. The ADC 43 digitizes the values of V-Sense and H-Sense stored by the sample/hold circuits 51 and 52, and passes those values to the control circuit 46.

The sampled values of V-Sense and H-Sense respectively taken when the photodiodes 18a and 18b are impinged upon by the laser beam 33 can be used by the control circuit 46 for modifying control of the mirror drivers 48 so as to control the opening angle of the vertical mirror 20 and horizontal mirror 24. In greater detail, when the photodiodes 18a and 18b are impinged upon by the laser beam 33, it is known from prior calibration what the deflection angles/mechanical angles of the vertical mirror 20 and horizontal mirror 24 are at those two instants. These known angles of the vertical mirror 20 and horizontal mirror 24 can be correlated to the signals V-Sense and H-Sense from the tilt sensors 44 and 45 to calibrate the tilt sensors 44 and 45 on the fly. Since the tilt sensors 44 and 45 are calibrated on the fly, this means that V-Sense and H-Sense can be used by the control circuit 46 in adjusting the mirror drivers 48 to a high degree of accuracy so as to maintain desired opening angles of the vertical mirror 20 and horizontal mirror 24 during operation. In particular, the control circuit 46 can determine corrections to apply to the raw V-Sense and H-Sense signals when using those signals in controlling the mirror drivers 48, based upon the samples of V-Sense and H-Sense taken when the vertical mirror 20 and horizontal mirror 24 are at known deflection/mechanical angles as indicated by triggering of the photodiodes 18a and 18b. As used herein, an opening angle of a mirror means the angle between its maximum positive deflection or mechanical angle and its maximum negative deflection or mechanical angle.

The above will now be mathematically described. In a calibration operation performed as a one-time setup during device fabrication, calibration values $A_0$ and $B_0$ can respectively be determined for the tilt sensors 44 and 45.

Calibration signal $A_0$ for the tilt sensor 44 can be determined during the calibration operation as a difference between the value $A_1^0$ of V-Sense when the laser beam 33 impinges upon the photodiode 18a and the value $A_2^0$ of V-Sense when the laser beam 33 impinges upon the photodiode 18b. Mathematically, this calculation can be represented as:

$$A_0 = A_1^0 - A_2^0$$

Calibration signal $B_0$ for the tilt sensor 45 can be determined during the calibration operation as a difference between the value $B_1^0$ of H-Sense when the laser beam 33 impinges upon the photodiode 18a and the value $B_2^0$ of H-Sense when the laser beam 33 impinges upon the photodiode 18b. Mathematically, this calculation can be represented as:

$$B_0 = B_1^0 - B_2^0$$

Keeping this in mind, during operation, a present value $A(t)$ for the tilt sensor 44 can be determined as a difference between the value $A_1(t)$ of V-Sense when the laser beam 33 impinges upon the photodiode 18a and the value $A_2(t)$ of V-Sense when the laser beam 33 impinges upon the photodiode 18b. Mathematically, this calculation can be represented as:

$$A(t) = A_1(t) - A_2(t)$$

From $A_0$ and $A(t)$, an instantaneous gain $GA(t)$ for the tilt sensor 44 can be calculated. Mathematically, this can be represented as:

$$G(t) = A_0 / A(t)$$

Likewise, a present value $B(t)$ for the tilt sensor 45 can be determined as a difference between the value $B_1(t)$ of H-Sense when the laser beam 33 impinges upon the photodiode 18a and the value $B_2(t)$ of H-Sense when the laser beam 33 impinges upon the photodiode 18b. Mathematically, this calculation can be represented as:

$$B(t) = B_1(t) - B_2(t)$$

From $B_0$ and $B(t)$, an instantaneous gain $GB(t)$ for the tilt sensor 44 can be calculated. Mathematically, this can be represented as:

$$GB(t) = B_0 / B(t)$$

Since $A(t)$ and $B(t)$ may vary over temperature, this means that the instantaneous gains $GA(t)$ and $GB(t)$ may vary over temperature. Therefore, by the control circuit 46 knowing the instantaneous gains $GA(t)$ and $GB(t)$, it can correct or scale the values of V-Sense and H-Sense to produce corrected or scaled values of V-Sense and H-Sense that are temperature independent, and its regulation of the mirror drivers 48 can be performed using the corrected or scaled values instead of the raw values which may be temperature dependent.

An advantage provided by this system is that the tilt sensors 44 and 45 do not need to be carefully calibrated over temperature at the time of device fabrication, as the on-the-fly calibration of the tilt sensors 44 and 45 performed by the control circuit 46 using the sampled values of V-Sense and H-Sense triggered by the photodiodes 18a and 18b compensates for temperature.

Further operation is enabled through the use of the photodiodes 18a and 18b. For example, since the control circuit 46 operates the mirror drivers 48, the control circuit 46 has a priori knowledge of when to expect the trigger circuit 42 to be triggered by the laser beam 33 impinging upon the photodiodes 18a and 18b. Thus, if the triggering does not occur, the control circuit 46 can assume that failure of a component has occurred and can cause the laser drivers 47 to stop driving the RGB package 12. The response time for this is equal to a time frame (expected time interval between two successive triggerings of the trigger circuit 42) divided by the number of tilt sensors, represented mathematically as:

$$T_{frame} / N_{sensors}$$

This fault detection is particularly useful because it can detect mirror failures not detected by the tilt sensors 44 and 45. For example, it is possible for a tilt sensor to break a torsional spring, and therefore report on movement of the piezoelectric actuator within the tilt sensor and not the mirror movement. Thus, this fault detection system can be used in addition to normal fault detection, or instead of normal fault detection.

Figure 8B:
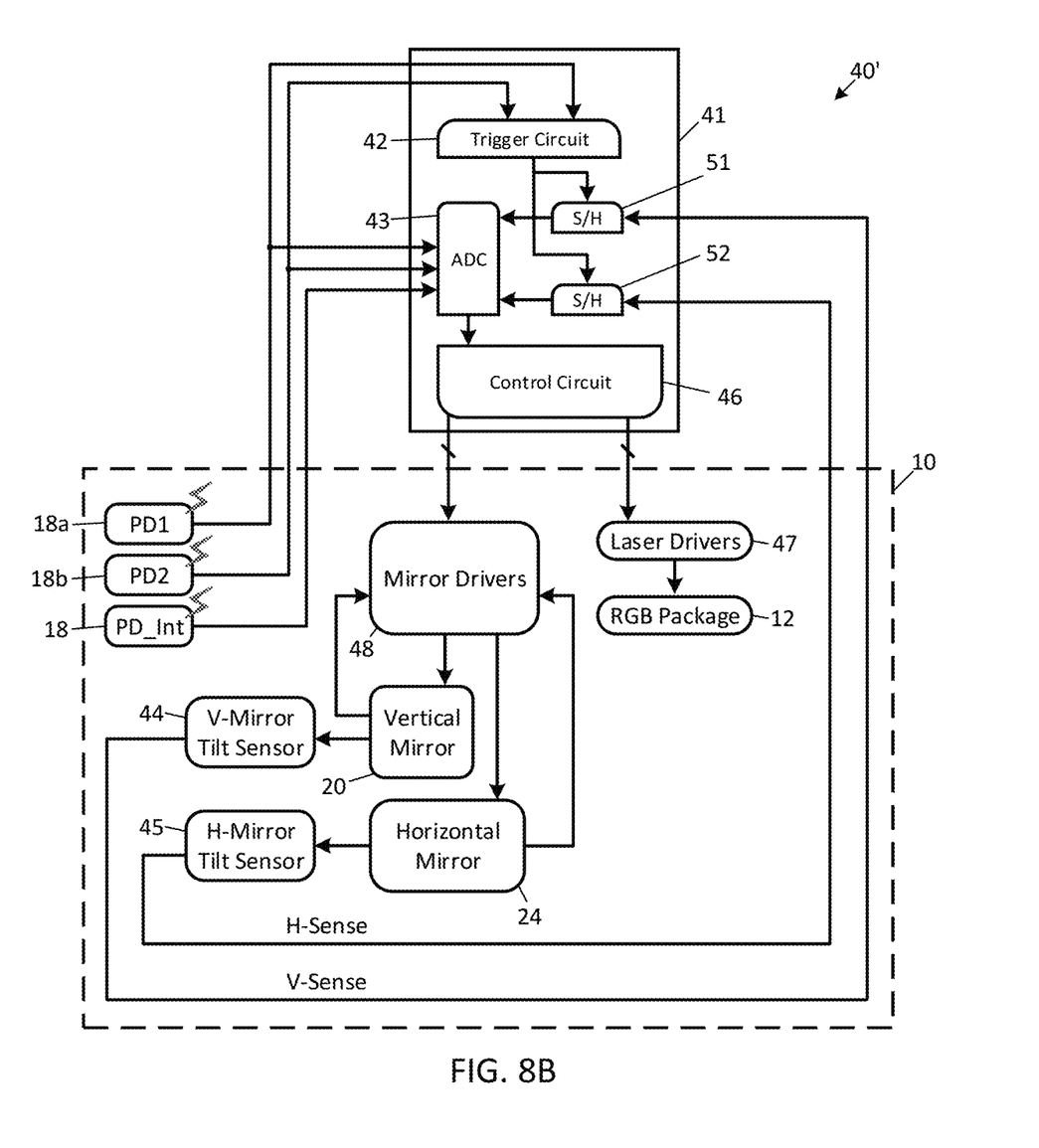
FIG. 8B is a second embodiment of a block diagram of a scanning laser projector including the optical module of FIG. 1.

Also note that through receipt of digitized versions of the outputs of the photodiodes 18a and 18b themselves, as shown in the embodiment of FIG. 8B, the control circuit 46 may perform additional functionality. For example, referring back to FIG. 7, regardless of where photodiode 18a is with respect to the vertical axis of the projection area, since it is located outside of the projection area (but inside the scanning area) and above the projection area, when the photodiode 18a is impinged upon by the laser, it can be inferred (explained in great detail below) that the laser beam 33 has successfully exited the projection area in the positive vertical direction; regardless of where photodiode 18b is with respect to the vertical axis of the projection area, since it is located outside of the projection area (but inside the scanning area) and below the projection area, when the photodiode 18b is impinged upon by the laser, it can be inferred that the laser beam 33 has successfully exited the projection area in the negative vertical direction; regardless of where photodiode 18c is with respect to the horizontal axis of the projection area, since it is located outside of the projection area (but inside the scanning area) and to the left of the projection area, when the photodiode 18c is impinged upon by the laser, it can be inferred that the laser beam 33 has successfully exited the projection area in the negative horizontal direction; and regardless of where photodiode 18d is with respect to the horizontal axis of the projection area, since it is located outside of the projection area (but inside the scanning area) and to the right of the projection area, when the photodiode 18d is impinged upon by the laser, it can be inferred that the laser beam 33 has successfully exited the projection area in the positive horizontal direction. Therefore, in addition to determining that a mirror error has occurred, the control circuit 46 can determine which mirror has failed, and in what direction, if desired.

In addition, the control circuit 46 can use feedback from the photodiodes 18a and 18b to control the color and intensity/brightness of the laser beam 33. Also, the control circuit 46 can use feedback from the photodiodes 18a and 18b to measure optical attenuation of the laser beam 33 due to the mirrors, for example by comparing color and intensity data from the photodiodes 18a and 18b to color and intensity data from the photodiode 18 (since the photodiode 18 measures the laser before reflection by the vertical mirror 20 and horizontal mirror 24).

Also, the control circuit 46 can use feedback from the photodiodes 18a and 18b to determine failure of the vertical mirror 20 and/or horizontal mirror 24 (without use of the trigger circuit 22) based upon the photodiodes 18a and 18b not being triggered according to the velocity of the swing of those mirrors. In the case of the horizontal mirror 24, which is driven at resonance, it can be expected that each photodiode 18a and 18b should be triggered at half the mirror swing—for example, a mirror operating at a 20 KHz resonance frequency will complete one full swing every 50 µs, and therefore, each photodiode 18a and 18b should detect the laser beam 33 every 25 µs. In the case of the vertical mirror 20, driven linearly, the velocity is constant and therefore each photodiode 18a and 18b is triggered at half mirror drive frequency. For example, a mirror operating at 60 Hz linearly will complete its entire swing in 16 ms, so each photodiode 18a and 18b should detect the laser beam 33 every 8 ms. In case either photodiode 18a and 18b does not detect the laser beam 33 at the expected time, mirror malfunction can be inferred.

Still further, the control circuit 46 can generate horizontal and vertical synchronization signals for use in controlling the mirror drivers 48. For example, by detecting the elapsed time between activation of the photodiode 18a by the laser beam 33 and activation of the photodiode 18b by the laser beam 33, such horizontal and vertical synchronization signals can be calculated.

In the above, photodiodes 18, and 18a-18g may actually be any light detecting devices, and may each be a one-dimensional array or two-dimensional array of photodiodes. Also, although the above descriptions of functionality are described with reference to the photodiodes 18a and 18b being present in addition to the photodiode 18, more such photodiodes (for example, photodiodes 18c, 18d, etc.) may be present to provide for more data points. Also, as described above, any position for such photodiodes about the interior surface of the housing 11 adjacent the exit window 26 may be used provided that at least two photodiodes are not on the same side of the exit window 26.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A scanning laser projector, comprising:
    an optical module, comprising:
        a housing defined by a top surface, a bottom surface, and sidewalls extending between the top surface and bottom surface to define an interior compartment within the housing;
        wherein a given one of the sidewalls has an exit window defined therein;
        a first light detector positioned at an interior surface of the given one of the sidewalls about a periphery of the exit window; and
        a second light detector positioned at the interior surface of the given one of the sidewalls about the periphery of the exit window and on a different side thereof than the first light detector.

2. The optical module of claim 1, wherein the first and second light detectors are located on opposite sides of the periphery of the exit window.

3. The optical module of claim 1, wherein the first and second light detectors are located on opposite sides of a vertical axis that bisects the exit window.

4. The optical module of claim 3, wherein the first and second light detectors are also located on opposite sides of a horizontal axis perpendicular to vertical first axis.

5. The optical module of claim 1, configured to define a laser scanning projector and further comprising:
    a movable mirror apparatus within the optical module; and
    a projection engine configured to adjust driving of the movable mirror apparatus based upon output from the first and second light detectors.

6. The laser scanning projector of claim 5, wherein the projection engine adjusts the driving of the movable mirror apparatus to maintain a first mirror within the movable mirror apparatus at a first opening angle.

7. The scanning laser projector of claim 5, wherein the projection engine is configured to generate horizontal and vertical synchronization signals for movable mirror apparatus based upon an elapsed time between detections of the single laser beam by the first light detector and then by the second light detector.

8. The scanning laser projector of claim 5, wherein the projection engine is further configured to determine failure of the movable mirror apparatus based upon a lack of expected output from the first and second light detectors at expected times.

9. The optical module of claim 1, further comprising:
    a third light detector positioned at the interior surface of the given one of the sidewalls about the periphery of the exit window and on a different side thereof than the first and second light detectors; and
    a fourth light detector positioned at the interior surface of the given one of the sidewalls about the periphery of the exit window and on a different side thereof than the first, second, and third light detectors;
    wherein the first and second light detectors are located on opposite sides of a vertical axis that bisects the exit window and the third and fourth light detectors are located on opposite sides of a horizontal axis that bisects the exit window.

10. The optical module of claim 9, wherein the third and fourth light detectors are located along the vertical axis; further comprising:
    a fifth light detector at the interior surface of the given one of the sidewalls about the periphery of the exit window and on a same side of the exit window as the third light detector; and
    a sixth light detector at the interior surface of the given one of the sidewalls about the periphery of the exit window and on a same side of the exit window as the third light detector but on an opposite side of the vertical axis as the fifth light detector.

11. The optical module of claim 10, further comprising:
    a seventh light detector at the interior surface of the given one of the sidewalls about the periphery of the exit window and on a same side of the exit window as the fourth light detector; and an eighth light detector at the interior surface of the given one of the sidewalls about the periphery of the exit window and on a same side of the exit window as the fourth light detector but on an opposite side of the vertical axis as the seventh light detector.

12. The optical module of claim 11, wherein the fifth and eighth light detectors are located along a first diagonal axis that forms an obtuse angle with the horizontal axis; and wherein the sixth and eleventh light detectors are located along a second diagonal axis that forms an acute angle with the horizontal axis.

13. The optical module of claim 1, wherein the first light detector is an array of photodiodes.

14. A method of operating a laser scanning projector contained within a housing, the method comprising:
   generating a single laser beam;
   scanning the single laser beam across an exit window defined through the housing in a scanning pattern wider than the exit window such that the single laser beam is directed through the exit window in a projection pattern, the projection pattern being smaller than and within the scanning pattern; and
   taking an action based upon attempted detection of the single laser beam as it impinges upon a first light detector positioned about a periphery of the exit window, wherein the action taken is to cease generation of the single laser beam when detection of the single laser beam does not occur at an expected time.

15. The method of claim 14, wherein the scanning of the single laser beam is performed using a movable mirror; and wherein the expected time is every half swing of the movable mirror.

16. The method of claim 14, wherein the scanning of the single laser beam is performed using a movable mirror; and wherein the action taken is to measure optical attenuation of the single laser beam due to the movable mirror.

17. The method of claim 16, wherein the scanning of the single laser beam is performed using a movable mirror; further comprising:
   measuring color and intensity of the single laser beam prior to scanning by the movable mirror; and
   measuring color and intensity of the single laser beam after scanning by the movable mirror using the first light detector;
   wherein the action taken is to compare the color and intensity measured prior to scanning to color and intensity measured by the first light detector.

* * * * *